United States Patent [19]

Christensen

[11] 4,336,226
[45] Jun. 22, 1982

[54] VANADIUM HYDRIDE DEUTERIUM-TRITIUM GENERATOR

[75] Inventor: Leslie D. Christensen, Livermore, Calif.

[73] Assignee: The United States of America as represented by the United States Department of Energy, Washington, D.C.

[21] Appl. No.: 129,867

[22] Filed: Mar. 13, 1980

[51] Int. Cl.³ .................. G05D 23/00; G05D 16/00
[52] U.S. Cl. .................. 422/109; 422/112; 422/159; 422/199; 141/197
[58] Field of Search .................. 423/249, 648 A, 645, 423/62; 48/61; 422/112, 109, 111, 305, 125, 199, 159, 903; 141/197

[56] References Cited

U.S. PATENT DOCUMENTS

| | | | |
|---|---|---|---|
| 2,710,249 | 6/1955 | Winsche et al. | 423/249 |
| 3,026,916 | 3/1962 | Kennedy | 141/197 |
| 4,018,190 | 4/1977 | Henault | 422/112 |
| 4,040,410 | 8/1977 | Libowitz | 423/645 |
| 4,075,312 | 2/1978 | Tanaka et al. | 423/648 A |
| 4,158,639 | 6/1979 | Berty | 423/249 |
| 4,160,014 | 7/1979 | Gamo et al. | 423/644 |

FOREIGN PATENT DOCUMENTS 2114789 10/1971 Fed. Rep. of Germany ...... 422/112
1509184  5/1978 United Kingdom ............... 423/645

OTHER PUBLICATIONS

Steward, S. A. et al., Lawrence Livermore Laboratory VCRL-77455 (Apr. 1976).
Holtrichter, J., Editor, Laser Fusion Monthly, Mar. 1979, pp. 20-24.

*Primary Examiner*—William F. Smith
*Assistant Examiner*—Chris Konkol
*Attorney, Agent, or Firm*—Henry P. Sartorio; Roger S. Gaither; Richard G. Besha

[57] ABSTRACT

A pressure controlled vanadium hydride gas generator to provide deuterium-tritium gas in a series of pressure increments. A high pressure chamber filled with vanadium-deuterium-tritium hydride is surrounded by a heater which controls the hydride temperature. The heater is actuated by a power controller which responds to the difference signal between the actual pressure signal and a programmed pressure signal.

9 Claims, 4 Drawing Figures

VANADIUM HYDRIDE DEUTERIUM-TRITIUM GENERATOR

The U.S. Government has rights in this invention pursuant to Contract No. W-7405-ENG-48 between the U.S. Department of Energy and the University of California.

BACKGROUND OF THE INVENTION

The invention relates generally to a deuterium-tritium gas generator and more particularly to a vanadium hydride gas generator to supply deuterium-tritium in a series of controlled pressure increments.

Inertial confinement fusion, including laser fusion, in which a small target containing deuterium-tritium (DT) fuel is imploded to high density and temperature to cause a fusion reaction, is currently being developed as an energy source of the future. High quality glass microspheres filled with gaseous deuterium-tritium, typically at pressures of several thousand psi, are being used as experimental laser fusion targets in this energy development program. The glass microspheres are filled with deuterium-tritium by a diffusion process in which deuterium-tritium gas is allowed to permeate through the wall of the glass sphere. Thick walled targets could be filled in a single step by placing a DT pressure of several thousand psi directly on the microsphere. However thin walled spheres, e.g., of 140 micron diameter with a one or two micron wall thickness, must be filled to a high pressure in a series of gradual pressure steps. The pressure differential across the thin wall must be kept small or the microspheres will be crushed. No conventional gas generator provides deuterium-tritium in a series of controlled pressure increments to permit fabrication of new target designs needed to advance this important energy research.

U.S. Pat. No. 3,291,572 to Fatica issued Dec. 13, 1966, discloses a gas generator to produce hydrogen gas when water comes into contact with lithium hydride. Hydrogen generation rates are controlled by a controlled water input.

U.S. Pat. No. 3,436,191 to McGoff et al issued Apr. 1, 1969, discloses an oxygen generator in which the number of oxygen generating candles turned on at any given time depends on the pressure of oxygen.

Metallic hydrides have been used for storage of hydrogen because the hydrides formed have a very hydrogen atom density. Several metals including vanadium, palladium and uranium, form hydrides with deuterium-tritium. *Metal Hydrides,* Mueller, Blackledge, Libowitz, Academic Press, New York and London, 1968, describes the properties and uses of metal hydrides.

U.S. Pat. No. 3,711,601 to Reilly et al issued Jan. 16, 1973, discloses a process in which vanadium hydride undergoes hydrogen exchange with gaseous mixtures of deuterium-tritium in order to concentrate and recover the heavy hydrogen isotopes.

SUMMARY OF THE INVENTION

It is accordingly an object of the invention to provide a gas generator for supplying deuterium-tritium in gas in a series of pressure increments.

It is a further object of the invention to produce a gas generated supply of deuterium-tritium gas in a series of controlled pressure increments.

Additional objects, novel features and advantages of the invention are set forth in the Detailed Description with reference to the accompanying drawings, and may be realized by the instrumentalities pointed out in the appended claims.

To achieve the foregoing and other objects, the invention comprises a vanadium hydride gas generator for supplying deuterium-tritium gas in a series of controlled pressure increments. A high pressure chamber filled with vanadium-deuterium-tritium hydride is surrounded by a heater which is actuated by a power controller. A pressure transducer connected to the chamber produces a signal proportional to the deuterium-tritium gas pressure which is compared to a signal from a programmed controller. The difference signal from the comparator is input to the power controller to control the vanadium hydride temperature and thereby the pressure of deuterium-tritium gas.

BRIEF DESCRIPTION OF THE DRAWINGS

The invention is described with reference to the accompanying drawings which are incorporated in and form a part of this specification, in which.

DETAILED DESCRIPTION OF THE PREFERRED EMBODIMENTS

Figure 1:
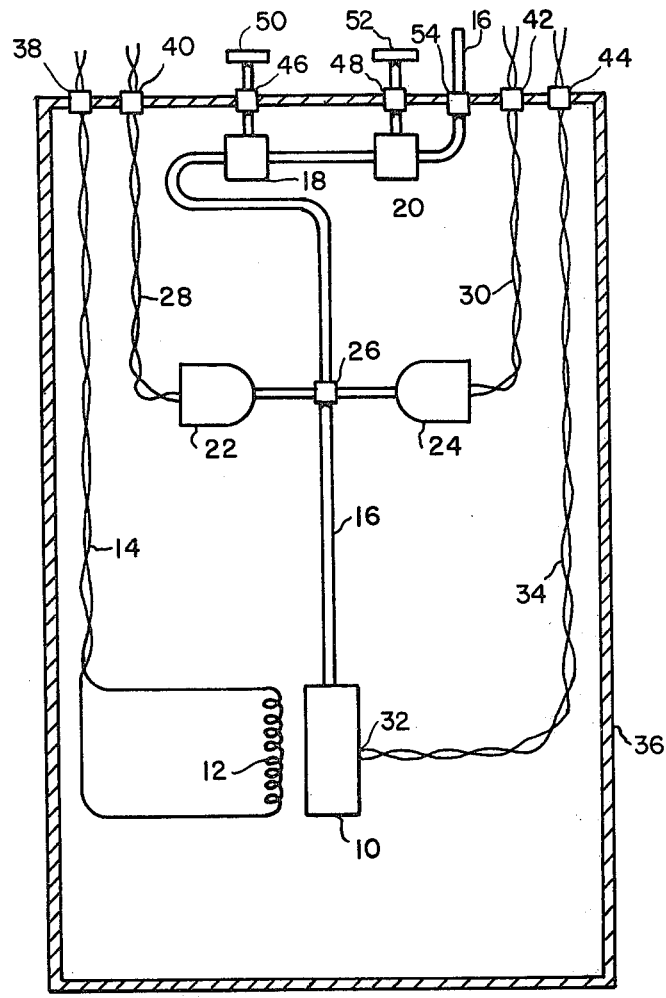
FIG. 1 is a schematic view of the vanadium hydride gas generator enclosed in a secondary container.

The vanadium hydride deuterium-tritium (DT) generator, as shown in FIG. 1, comprises a high pressure chamber 10 which is filled with vanadium-deuterium-tritium hydride. The chamber 10 is surrounded by a heater 12. The heater coil 12 is actuated by an electrical current flowing through wires 14. Vanadium forms a hydride at room temperature with the hydrogen isotopes deuterium and tritium. One mole of vanadium absorbs two moles of deuterium-tritium in a 50—50 ratio. Deuterium-tritium gas is released with the hydride is heated. Accordingly, the deuterium-tritium gas pressure is controlled by the heater coil 12.

A high pressure feed line 16 leads from the high pressure chamber 10 to carry the DT gas to the desired application. A pair of high pressure valves 18 and 20 are placed in series in the high pressure feed lines 16 to control the output of DT gas. Two valves are used for safety to minimize the chances of leaks of radioactive tritium. A pair of pressure transducers 22 and 24 are connected to the high pressure feed line 16 through junction 26. The outputs of the pressure transducers 22 and 24 are obtained through the electrical wires 28 and 30, respectively. One of the pressure transducers is used for control while the other is connected to a recorder. A pair of thermocouples 32 are connected to the high pressure chamber 10 and are connected through wires 34 to a recorder and to an over-temperature cutoff. All the components are contained in an evacuated secondary container 36 for safety in case the radioactive tritium leaks from one of the components. Electrical pass-throughs 38, 40, 42 and 44 allow the wires 14, 28, 30 and 34, respectively, to pass through the secondary container 36. Mechanical pass-throughs 46 and 48 allow the valves 18 and 20, respectively, to be actuated by valve handles 50 and 52, respectively, located outside the secondary container 36. Mechanical pass-through 54 permits high pressure feed line 16 to pass external to secondary container 36 to provide deuterium-tritium gas to the particular application.

Figure 2:
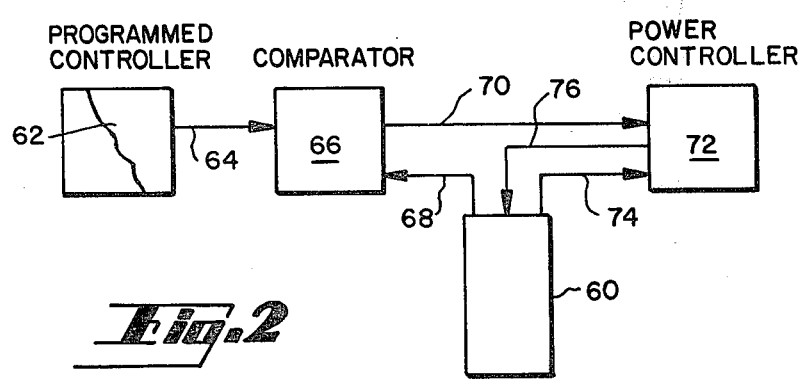
FIG. 2 is a schematic of the electrical control system of the gas generator.

The control system for the vanadium hydride DT gas generator is shown schematically in FIG. 2. Signal generator or programmed controller 62 produces a voltage signal representing the desired pressure at a given time. The desired pressure signal 64 is input into a comparator 66. The pressure signal 68 from one of the pressure transducers of the DT gas generator 60 is also input into the comparator 66. Because there is no consistent relationship between pressure and temperature in the vanadium hydride the voltage signal 68 from the pressure transducer in the gas generator is used to control the heater power. The pressure signal 68 is compared to the voltage signal 64 from the programmed controller 62 in the comparator 66. The output signal 70 from the comparator 66 goes to power controller 72. Over-temperature and over-pressure signals 74 are also input into power controller 72. Power controller 72 produces a heater power signal 76 to drive the heater. A long response time controller is used because of the time lag between application of power to the heater and gas release. In one particular embodiment of the invention, the signal generator 62 is a Data-Trak Programmer Model 5300, the comparator 66 is a Barber-Coleman Three-Function Controller Model 683-A and Digi-Set Differential Controller Model 354-A, and the power controller 72 is a Barber-Coleman Power Controller Series 621.

Figure 3:
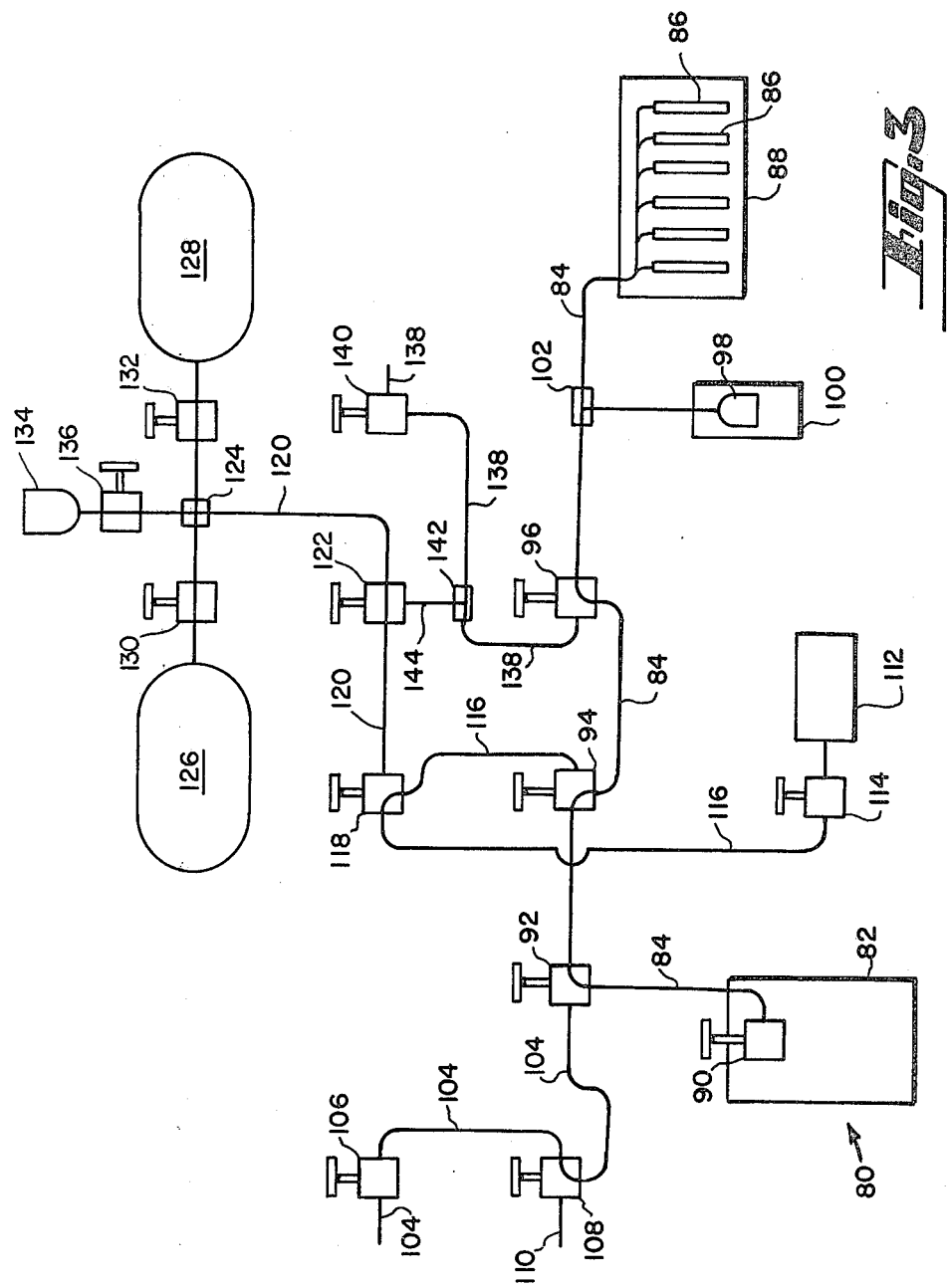
FIG. 3 is a schematic of the total mechanical system utilizing the gas generator to fill glass microspheres.

In the filling system shown schematically in FIG. 3, the vanadium hydride DT generator 80 contained in secondary container 82, provides incremental pressure increments of deuterium-tritium gas through line 84 to fill tubes 86 contained in secondary container 88. The fill tubes 86 contain the microspheres which are filled under pressure with deuterium-tritium gas. The output from the gas generator 80 is controlled by valve 90 on line 84 contained inside the secondary container 82. In practice, as shown in FIG. 1, a second valve in series is provided for safety. The high pressure line 84 passes through isolation valve 92, fill valve 94, and abort valve 96. High pressure transducer 98 contained in secondary container 100 measures the deuterium-tritium gas pressure in line 84 at junction 102. Supply line 104 from a deuterium or helium supply passes through supply valve 106 and vacuum valve 108 to isolation valve 92. Vacuum line 110 from a vacuum source also passes through vacuum valve 108. Deuterium-tritium high pressure supply 112 passes through high pressure valve 114 through line 116 which passes through high pressure drain valve 118 and into fill valve 94. Line 120 leads from high pressure drain valve 118 through abort drain valve 122 to junction 124. Abort tanks 126 and 128 are connected through valves 130 and 132, respectively, to junction 124 and low pressure transducer 134 is connected through valve 136 to junction 124. Line 138 from a sample supply passes through sample valve 140 and through junction 142 to abort valve 96. Line 144 passes from junction 142 to abort drain valve 122.

Glass laser fusion targets contained in fill tubes 86 are filled with deuterium-tritium gas from the vanadium hydride deuterium-tritium generator 80. After the fill tubes 86 are loaded with the glass microspheres, the fill system is evacuated. The fill system is first pressurized to above the final DT pressure with helium from supply line 104 and leak checked. The secondary container 88 is closed and evacuated, then filled to about ⅓ atmosphere with argon. The fill tubes 86 are heated to operating temperatures, usually about 400° C., by heaters (not shown) to make the glass spheres more permeable, and a vacuum is maintained on the fill system by means of a mechanical pump. The pressure is below 1 mm. Isolation valve 92 and vacuum valve 108 are then closed so that deuterium-tritium can be added from generator 80. To fill from the vanadium hydride generator 80 the heater to the generator is actuated and valve 90 plus the second valve in series (not shown) are opened. After the proper pressure is obtained, the valve 90 and the other valve are closed and the heat is turned off.

For a step or ramp fill, the fill tubes 86 are heated to operating temperature, usually 400° C., and helium is added step-wise to check for leaks. The helium is then evacuated and the secondary container 88 is closed and evacuated and then filled to about ⅓ atmosphere with argon. Vacuum valve 108 and isolation valve 92 are closed. The system is then filled step-wise with deuterium-tritium using the programmed controller 62 to obtain the desired pressure steps in the vanadium hydride generator 80 as above.

When the run is completed the heat is turned off the fill tubes 86 which cool to below 50° C. Valve 90 and the additional valve (not shown) are opened and then closed. Abort tank valve 130 or 132, abort drain valve 122, and abort valve 96 are opened and the fill system is flushed at least three times with helium. Abort valve 96, abort drain valve 122 and abort tank valve 130 or 132 are then closed and the fill system evacuated. All valves are closed and fill tubes 86 are removed.

Figure 4:
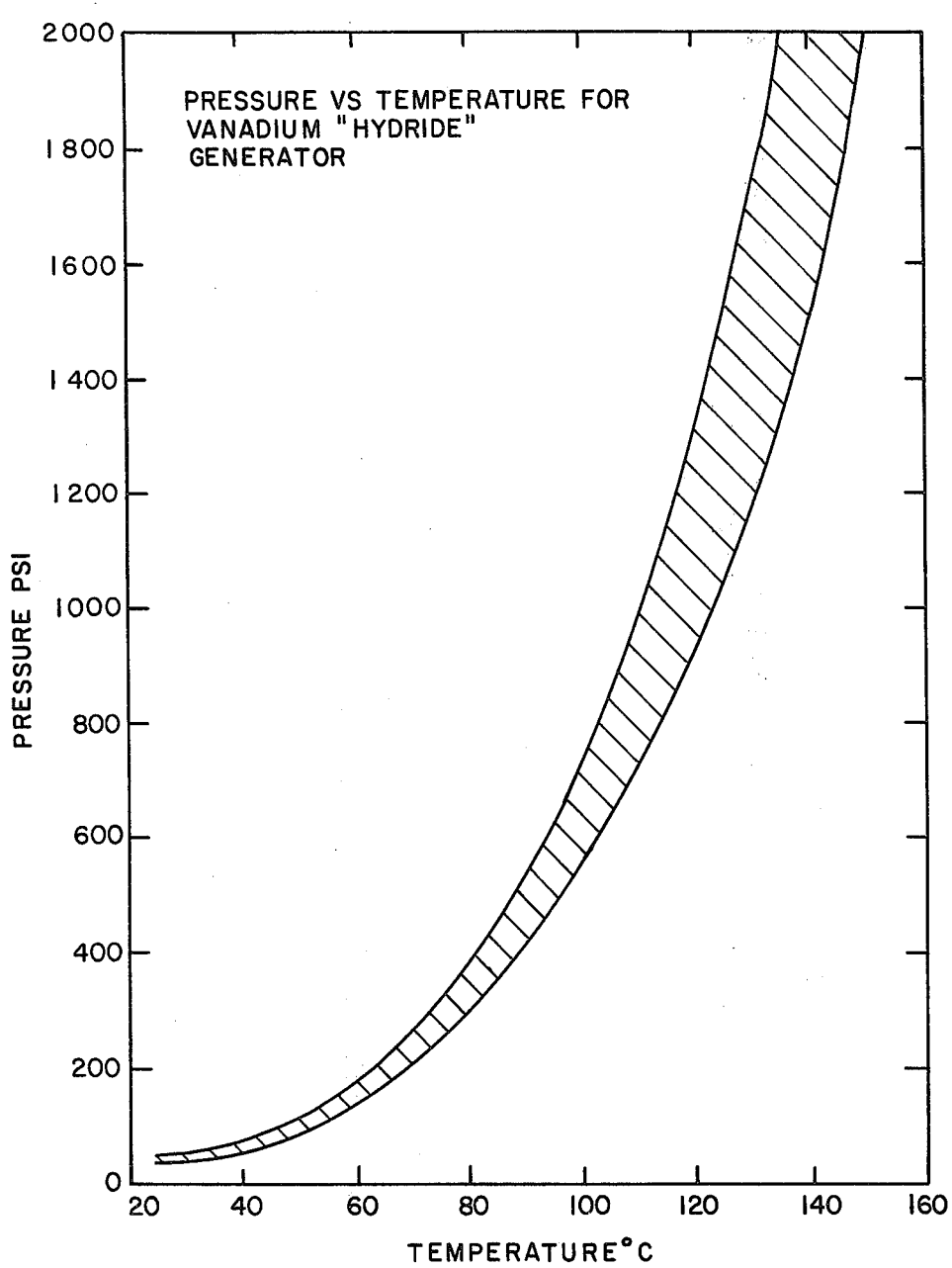
FIG. 4 is a graph of the deuterium-tritium pressure as a function of temperature.

The pressure vs. temperature for the vanadium hydride generator is shown in FIG. 4. Pressure for a given temperature is not a constant, but varies dependent on the size of the system, the amount of gas on the vanadium, and the heating rate. A pressure of around 10,000 psi can be obtained at around 300° C., so the pressures generally desired, about 2,000 psi, can be produced at around 140°–150° C. Fills have been performed at pressures as low as about 25 psi, which is the DT pressure with the vanadium hydride at room temperature, and at pressures as high as about 10,000 psi. However, the typical fill pressure is about 2,000 psi, which provides about 10 mg/cc of DT fuel in each microsphere. In operation the vanadium hydride is heated in steps to supply a graduated deuterium-tritium pressure for filling the microspheres. Equal pressure increments are used. The pressure increment is determined primarily by the pressure increment that the glass shell can withstand, and is typically a few hundred psi. Typically the DT fill is done in nine steps of six hours each for a total fill time of about 50 hours. After the filling procedure the vanadium chamber is allowed to cool down so that the DT is reabsorbed as hydride. Only the DT permeated into the microspheres, and the low pressure residual gas from the fill system that goes into the abort tanks is removed during each fill, so the supply lasts one or two years without recharging. The DT supply 112 is used to resupply the vanadium chamber as necessary.

Changes and modifications in the specifically described embodiments can be carried out without departing from the scope of the invention which is intended to be limited only by the scope of the appended claims.

What is claimed is:

1. A gas generator for supplying deuterium-tritium gas in a series of pressure increments, comprising:

a high pressure chamber filled with a deuterium-tritium hydride which produces a deuterium-tritium gas pressure when heated;

a heater surrounding the chamber and in thermal contact therewith to heat the deuterium-tritium hydride;

a pressure transducer connected to the chamber to measure the deuterium-tritium gas pressure, producing a signal proportional to the deuterium-tritium gas pressure;

a programmed controller producing a signal representing the desired pressure at a given time, the desired pressure corresponding to a series of preselected pressure increments over a preselected period of time;

a comparator to compare the pressure transducer signal to the programmed controller signal and to produce a difference signal therebetween; and a power controller connected to the output of the comparator and actuated by the difference signal, the output of the power controller being connected to the heater to actuate the heater to heat the hydride through the series of pressure increments to produce the desired gas pressure.

2. The gas generator of claim 1 wherein the deuterium-tritium hydride is vanadium deuterium-tritium hydride.

3. The gas generator of claims 1 or 2 further including a high pressure gas feed line from the chamber.

4. The gas generator of claim 3 further including at least one high pressure valve in the gas feed line.

5. The gas generator of claim 4 wherein the chamber is enclosed in a secondary container.

6. The gas generator of claim 1 wherein the deuterium-tritium gas pressure is in the range 25–10,000 psi.

7. A gas generator for supplying deuterium-tritium gas in a series of pressure increments to a total pressure in the range 25–10,000 psi, comprising:

a high pressure chamber filled with vanadium deuterium-tritium hydride which produces a deuterium-tritium gas pressure when heated;

a heater surrounding the chamber and in thermal contact therewith to heat the deuterium-tritium hydride;

a pressure transducer connected to the chamber to measure the deuterium-tritium gas pressure, producing a signal proportional to the deuterium-tritium gas pressure;

a programmed controller producing a signal representing the desired pressure at a given time, the desired pressure corresponding to a series of preselected pressure increments over a preselected period of time;

a comparator to compare the pressure transducer signal to the programmed controller signal and to produce a difference signal therebetween; and a power controller connected to the output of the comparator and actuated by the difference signal, the output of the power controller being connected to the heater to actuate the heater to heat the hydride through the series of pressure increments to produce the desired gas pressure in the range 25–10,000 psi.

8. In an apparatus for filling hollow microspheres with deuterium-tritium gas in a series of pressure increments to a pressure in the range 25–10,000 psi, the apparatus having a fill tube containing a plurality of hollow microspheres, and a gas feed line to the fill tube, the improvement comprising:

a high pressure chamber filled with vanadium deuterium-tritium hydride which produces a deuterium-tritium gas pressure when heated;

a heater surrounding the chamber and in thermal contact therewith to heat the deuterium-tritium hydride;

a high pressure gas feed line extending from the chamber and connected through a valve to the gas feed line to the fill tube;

a pressure transducer connected to the chamber to measure the deuterium-tritium gas pressure, producing a signal proportional to the deuterium-tritium gas pressure;

a programmed controller producing a signal representing the desired pressure at a given time, the desired pressure corresponding to a series of preselected pressure increments over a preselected period of time;

a comparator to compare the pressure transducer signal to the programmed controller signal and to produce a difference signal therebetween; and a power controller connected to the output of the comparator and actuated by the difference signal, the output of the power controller being connected to the heater to actuate the heater to heat the hydride through the series of pressure increments to produce the desired gas pressure in the range 25–10,000 psi.

9. The apparatus of claims 1, 7 or 8 wherein the heater is an electrical heater.

* * * * *